United States Patent [19]

Tiedeck et al.

[11] Patent Number: 5,352,313
[45] Date of Patent: Oct. 4, 1994

[54] SEALANT AND WINDOW CARRIER STRUCTURES

[76] Inventors: Michael T. Tiedeck, 431 Calvin, Grosse Pointe Farms, Mich. 48236; Gene A. Miceli, 1460 Winchell Dr., Hudson, Ohio 44236

[21] Appl. No.: 10,661

[22] Filed: Jan. 28, 1993

[51] Int. Cl.5 ............................................ B32B 31/04
[52] U.S. Cl. ................................. 156/230; 156/232; 156/247; 156/249; 156/289; 156/538; 156/540
[58] Field of Search ............... 156/106, 107, 230, 232, 156/242, 245, 247, 249, 540, 538, 289

[56] References Cited

U.S. PATENT DOCUMENTS

| | | |
|---|---|---|
| 3,385,462 | 5/1968 | Deldime et al. . |
| 3,427,776 | 2/1969 | Lake et al. . |
| 3,477,867 | 11/1969 | Hillier . |
| 3,653,673 | 2/1972 | Green . |
| 3,925,947 | 12/1975 | Meyers et al. . |
| 4,072,340 | 2/1978 | Morgan . |
| 4,139,234 | 2/1979 | Morgan . |
| 4,181,313 | 1/1980 | Hillier et al. . |
| 4,254,960 | 3/1981 | Jelinek . |
| 4,273,607 | 6/1981 | Paul ..................................... 156/540 |
| 4,364,595 | 12/1982 | Morgan et al. . |
| 4,437,266 | 3/1984 | Keller . |
| 4,458,628 | 7/1984 | Fujii et al. . |
| 4,634,132 | 1/1987 | Jelinek . |
| 4,728,380 | 3/1988 | Jones et al. . |
| 4,834,824 | 5/1989 | Tiedeck . |

*Primary Examiner*—Caleb Weston

[57] ABSTRACT

In a method of transporting vehicle windows and sealant, the sealant is preferably inserted into a sealant groove formed in a carrier. The carrier thus forms both a mold for forming the sealant and a transport device. The sealant groove includes a release agent such that the sealant easily leaves the groove. The carriers have structure such that they may be stacked in a first orientation wherein a relatively great spacing is provided between the carriers. The carriers are stacked in this orientation when a window and/or sealant is received on the carriers. After the windows and sealant have been removed from the carriers, the carriers are restacked in a second orientation wherein the distance between adjacent stacked carriers is substantially smaller. This orientation is used when the carriers are returned for re-use.

20 Claims, 3 Drawing Sheets

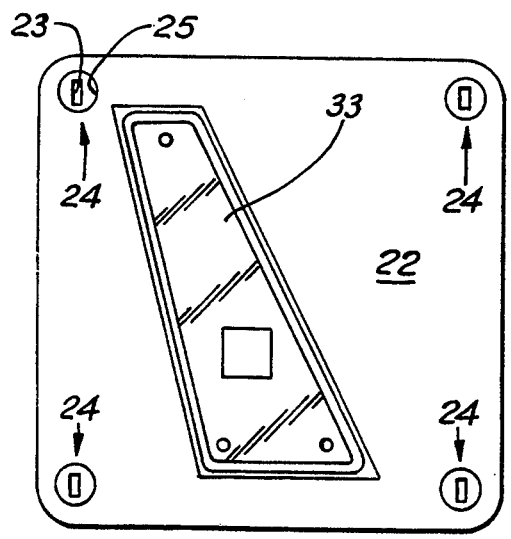
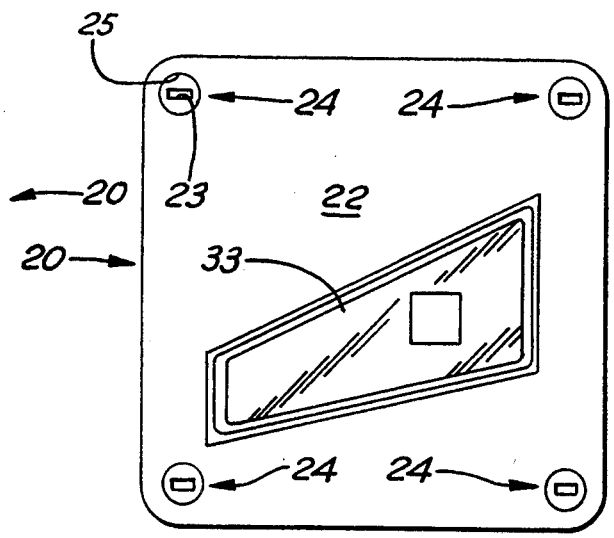
FIG.1 FIG.2
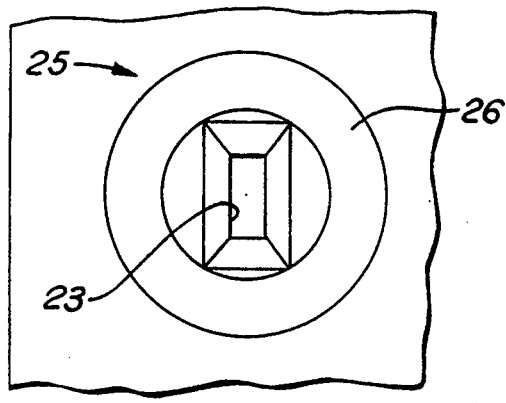
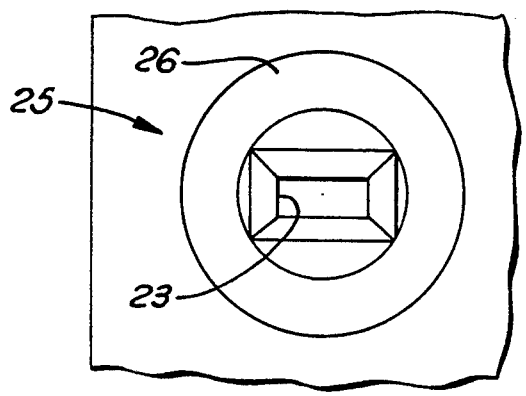
FIG.3 FIG.4
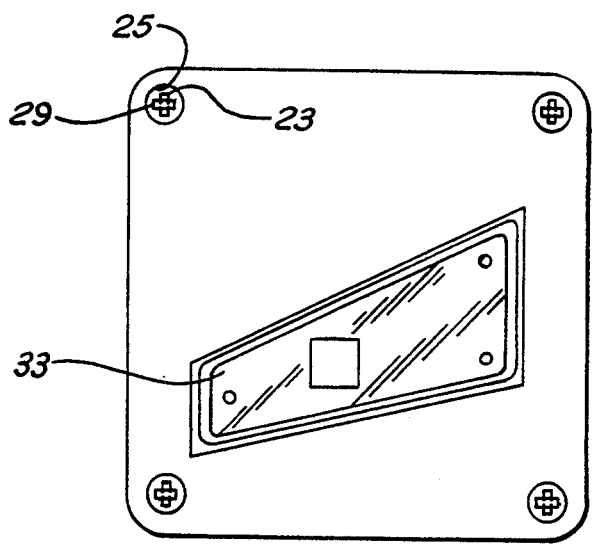
FIG.5

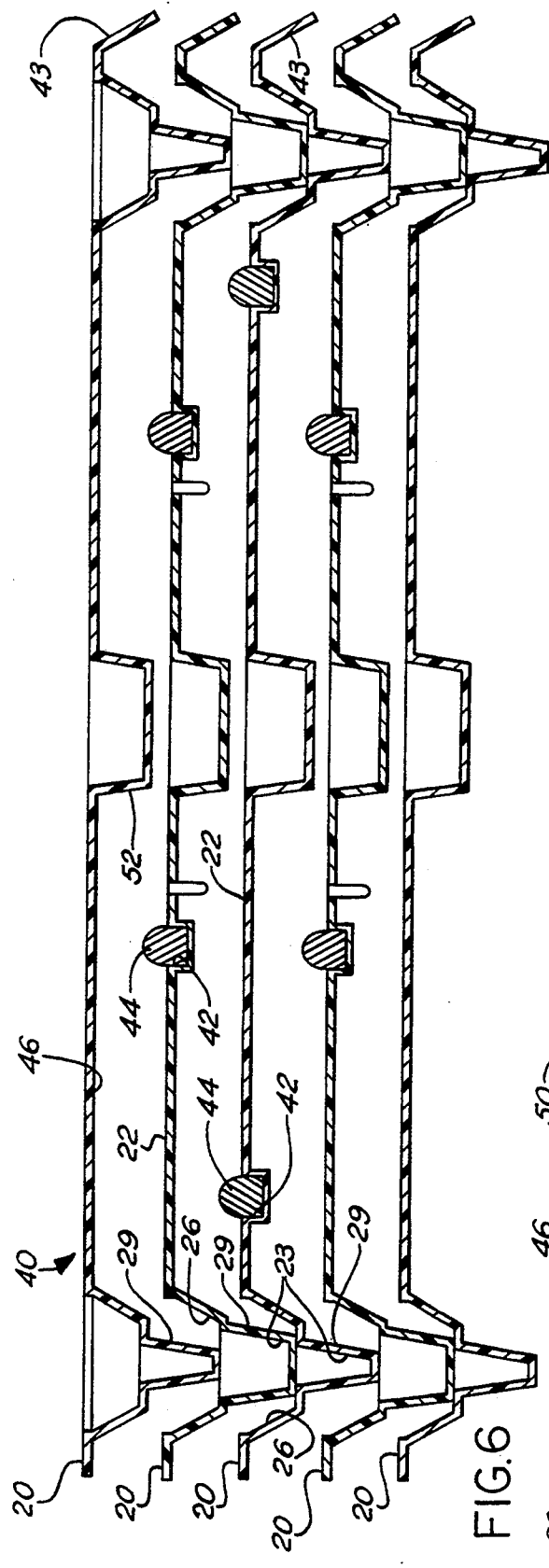
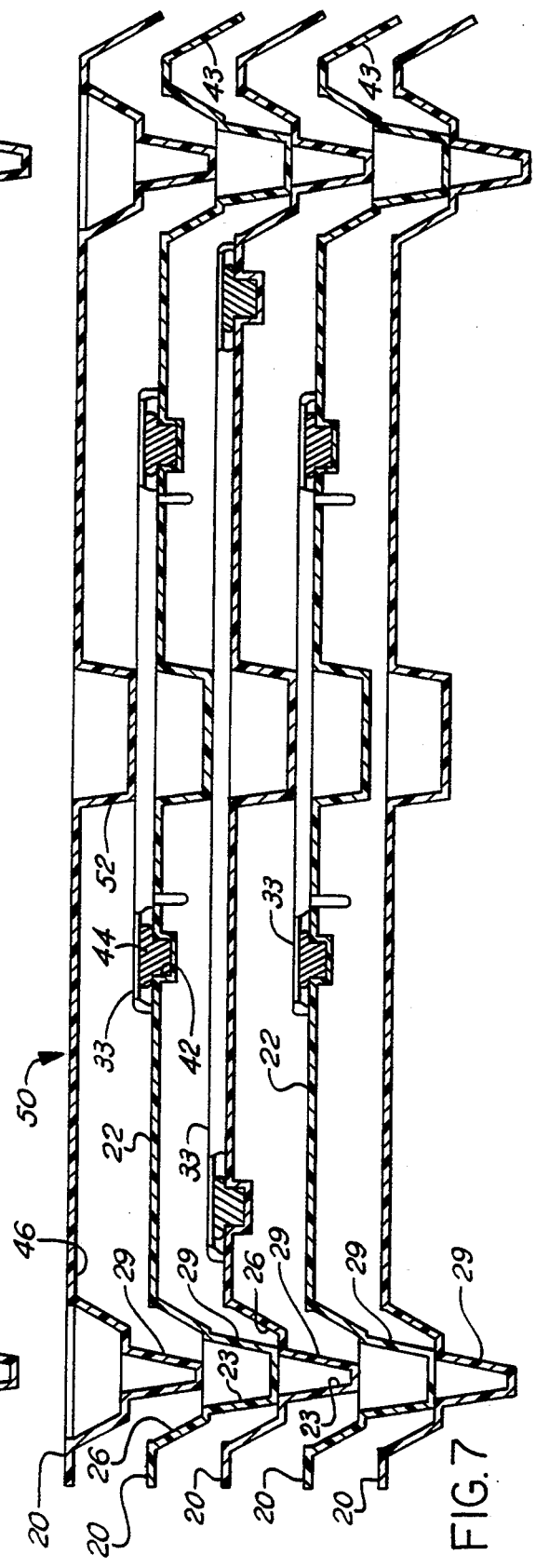
FIG.6
FIG.7

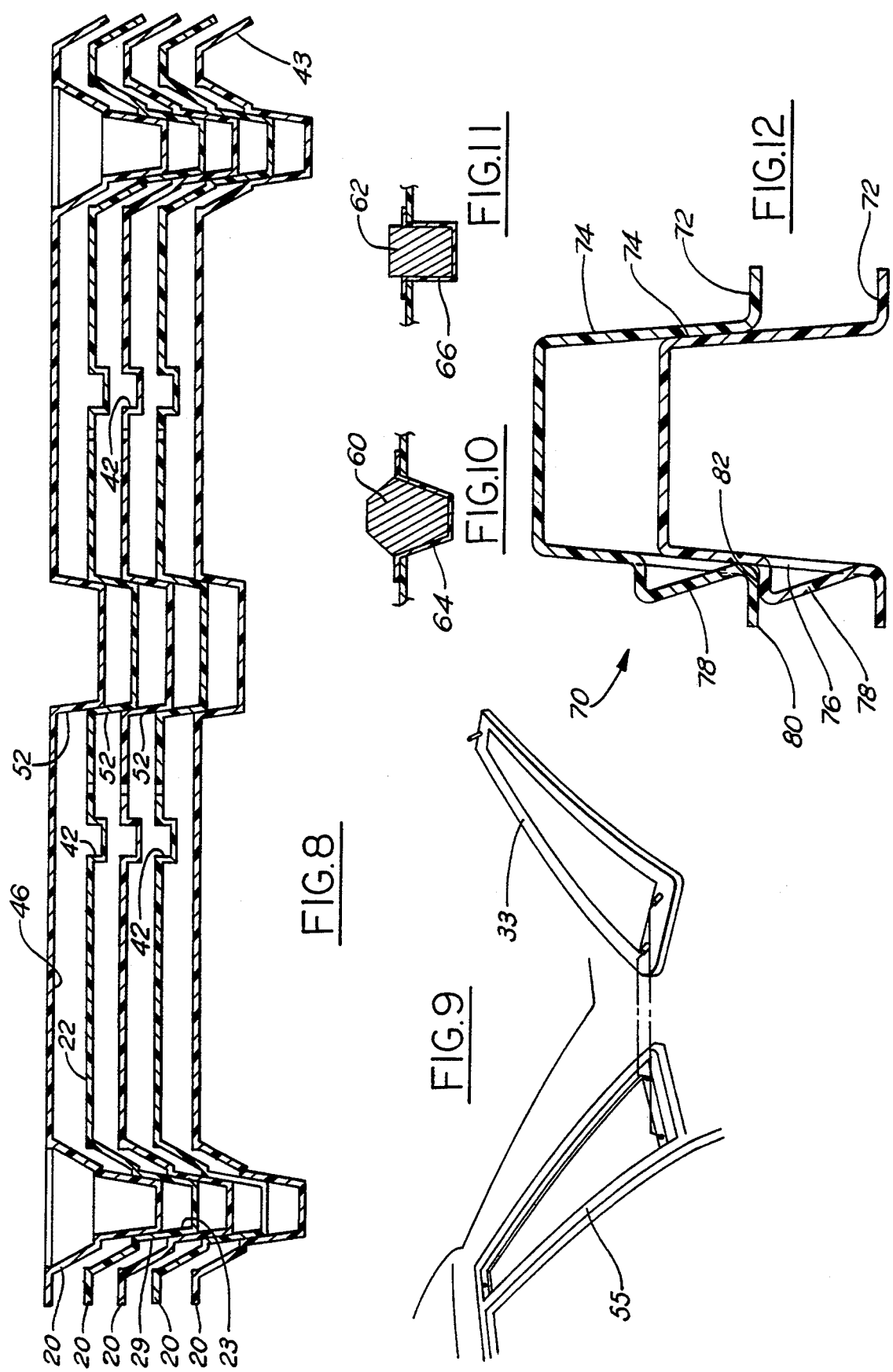

SEALANT AND WINDOW CARRIER STRUCTURES

BACKGROUND OF THE INVENTION

This invention relates to a unique method of transporting and storing vehicle fixed modular windows, and sealant for the windows.

In the prior art, windows were delivered to vehicle assembly lines, and often had a sealant placed around their periphery at the assembly line. The window was then inserted into a vehicle body. In modern industrial facilities, a main thrust of inventive effort is to reduce the method steps which are actually performed at the assembly line.

Thus, it would be beneficial to reduce the steps of delivering a window member to an assembly line and then placing a sealant on the window member at the assembly line. To this end, windows having a sealant at their peripheries when delivered to the assembly line are known. It would be desirable to improve the method and manner in which these windows are transported.

SUMMARY OF THE INVENTION

The present invention relates to a carrier having a groove which provides a mold to receive a sealant. The groove is dimensioned such that the sealant is formed to a desired shape for use with a particular workpiece. The groove may additionally be dimensioned such that it causes the sealant to form various desirably different profile along the periphery.

The carrier is also used to transport the formed sealant to a location where it receives a workpiece such as a window, and then may also be used to transport the workpiece and the sealant to an assembly location. By transporting the sealant while it is in the groove on the carrier, the groove serves to protect the sealant. Thus, the number of assembly steps in forming the sealant are substantially reduced, and the sealant is substantially protected during transport.

The carrier preferably has a plurality of pegs on a lower surface panel and peg openings on an upper surface which are generally oblong. Several carriers may be positioned atop each other with the pegs and peg opening rotated by 90 degrees relative to the pegs and peg openings on an adjacent carrier; the carriers then stack with a first relatively great spacing between adjacent carriers. The carriers are stacked in this way when they are carrying a workpiece, such as a window with sealant applied to its periphery or only sealant. Overlapping sides of the carriers may form a protection from dirt and debris for the sealant within the groove of the carrier during transportation to the fixed window manufacturer and later to the fixed window module when it is transported in the stacked carriers to the vehicle manufacturer. When the carriers are empty, the pegs and peg openings on adjacent carriers are rotated such that they are aligned. The spacing between adjacent carriers is reduced, and the required volume for the empty carriers, which are typically being transported back to a location where they will receive new sealant and workpieces, is also reduced.

The carriers may also be stacked such that they are all in the same orientation.

The instant invention relates to the carrier device, and further to a method of utilizing the carrier device to transport workpieces and sealant.

This and other features of the present invention can be best understood from the following specification and drawings, of which the following is a brief description.

BRIEF DESCRIPTION OF THE DRAWINGS

FIG. 1 is a plan view of a carrier in a first orientation.

FIG. 2 is a plan view of the carrier shown in FIG. 1 rotated by 90 degrees.

FIG. 3 is an enlarged view through a portion of the carrier shown in FIG. 1.

FIG. 4 is a view similar to FIG. 3, but showing the portion of the carrier rotated by 90 degrees as in FIG. 2.

FIG. 5 shows stacked carriers.

FIG. 6 is a cross-sectional view through stacked carriers with sealants.

FIG. 7 is a cross-sectional view through stacked carriers with sealants and workpieces.

FIG. 8 is a cross-sectional view through stacked carriers with the sealants and workpieces removed.

FIG. 9 shows the insertion of a window into a vehicle body.

FIG. 10 shows an alternative sealant cross-section.

FIG. 11 shows an alternative sealant cross-section.

FIG. 12 shows stacked modified carriers.

DETAILED DESCRIPTION OF A PREFERRED EMBODIMENT

FIG. 1 illustrates a carrier 20 having a top surface 22 and, at each of its four corners, a peg member 24 which consists of a peg 29, described below, and a peg opening 25. As shown, peg openings 25 each have a central portion 23 which is generally oblong. The pegs extend from a lower surface and are configured similar to central portion 23. A workpiece or window 33 is received on top surface 22.

FIG. 2 shows a carrier 20 identical to that shown in FIG. 1, but having been rotated by 90 degrees relative to the position shown in FIG. 1. Oblong central portions 23 are now not aligned with the position shown in FIG. 1. As will be described below, a corresponding oblong peg 29 extends from a bottom surface of carrier 20. Peg openings 25 are adapted to receive the pegs extending from the bottom surface of an adjacent stacked carrier 20. When the pegs and peg openings 25 are aligned, the pegs 29 move into central portions 23 of a lower stacked carrier 22. If the pegs 29 are rotated by 90 degrees to the position shown in FIG. 2, then the pegs will only be able to move downwardly into central portions 23 through a limited extent.

As shown in FIG. 3, the peg opening 25 consists of an upper enlarged portion 26 which is generally frusto-conical, and a central portion 23. As shown in FIG. 4, peg opening 25 is rotated by 90 degrees relative to the peg opening 25 shown in FIG. 3. The outer surface of the peg is of generally the same cross-section as the inner surface of central portion 23. Thus, if two carriers 20 are positioned offset by 90 degrees, as shown in FIG. 5, then a peg 29 associated with an upper stacked carrier 20 would not extend downwardly all the way into the central portions 23 of peg opening 25 associated with the adjacent lower stacked carrier 20. The carriers 20 are preferably aligned in this way should there be sealant in the sealant groove and/or workpiece such as window 33 mounted on the carrier 20.

As shown in FIG. 6, a plurality of carriers 20 may be stacked as shown by the structure 40. An endless sealant groove 42 provided in top surface 22 receives a sealant 44. By rotating the adjacent stacked carriers 20, such that the pegs 29 do not extend downwardly into the central portions 23 (as is shown in this figure), there is a relatively great spacing between top surface 22 of a carrier 20, and the lower surface 46 of the next adjacent upper carrier 20. In this way, the lower surface 46 does not contact the sealant 44. When the carriers 20 are transported with sealant, they are preferably stacked in this way. The sealant may be inserted by a robotic manipulator, or any other type of sealant dispensing unit. The sealant may be inserted into the groove 42 at a first location, and stacked carriers 20 may then be moved to a location wherein the windows 33 are placed on the carriers.

A skirt 43 is formed around the entire outer periphery of each of the carriers. Skirts 43 are only illustrated on one edge of the carrier in FIGS. 6–8, but it should be understood they preferably extend around the entire periphery of the carrier 20. Skirts 43 extend downwardly to an extent such that they extend vertically beyond the top surface 22 of the next lower adjacent carrier 20. In this way, the skirts 43 serve to seal off the interior of the space between the adjacent carriers 20. Thus, the endless sealing groove 42 and workpiece 33 are protected while transported in this way. Note that the skirts 43 are angled outwardly. This feature allows the skirts 43 to nest, as is shown in FIG. 8.

The stacked carriers 20 protect the sealant 44 from dust or other impurities, but do not contact the sealant, other than at groove 42. Preferably a release agent is used at the grooves 42 such that the sealant 44 is easily removed.

A plurality of stacked carriers 20 are shown by the structure 50 in FIG. 7. The carriers 20 are carrying windows 33. The pegs 29 and peg openings 25 on adjacent carriers 20 are still offset. A boss 52 extends downwardly from lower surface 46 and contacts window 33, holding it in place. The window 33 contacts sealant 44. The release agent utilized in sealant groove 42 ensures that sealant 44 is easily removed from sealant groove 42. That is, window 33 is pressed downwardly onto sealant 44. Sealant 44 then becomes adhered to window 33, and easily leaves the sealant groove 42 when window 33 is removed from the carrier top surface 22.

As shown in FIG. 8, once the window has been removed at an assembly line, the carriers 20 may be aligned. In this configuration, the pegs 29 extend downwardly into the central portions 23 of peg openings 25. Thus, the distance between lower surface 46, and upper surface 22 is greatly reduced over the alignments shown by the stacked structures in FIGS. 6 and 7. Moreover, bosses 52 are aligned within the bosses 52 in the underlying carriers 20. Skirts 43 nest in this position.

As shown in FIG. 9, window 33 may be inserted onto a vehicle body 55. When window 33 is removed from the carrier 20 it will carry the sealant 44 along therewith.

After the windows are removed, the carriers 20 are restacked as shown in FIG. 8. The carriers 20 are then returned to a sealant dispensing location. At the sealant dispensing location, new sealant 44 is dispensed into sealant grooves 42. The carriers 20 are then stacked again as shown in FIG. 6. The carriers 20 then move to a window dispensing location wherein windows 33 are placed on the carriers 20. It is possible that the windows 33 and sealant 44 could be placed onto the carriers 20 at the same location. The carriers 20 with windows 33 are stacked as shown in FIG. 7.

FIGS. 10 and 11 show that the sealant grooves can be configured in different ways to form different sealant cross-sections 60, 62. As shown in these figures, the sealant groove could be formed by easily removable inserts 64, 66, such that the cross-section of the sealant could be changed for various applications. A uniform carrier 22 could be utilized for the various sealant cross-sections. Additionally, the sealant cross-section could change along the periphery of the sealant groove if desired.

FIG. 12 shows another carrier embodiment 70, wherein a top face 72 (shown partially) receives a sealant groove, not shown. A stand-off 74 is formed around the entire periphery, and is received on stand-off 74 from a lower stacked carrier 70. In this embodiment carriers 70 are always stacked aligned from an upper carrier 70. An outer wall 76 has legs 78 bent outwardly at spaced locations. Legs 78 each includes a foot 80 that rests on top 82 of a lower carrier 70 to support an upper carrier 70.

The sealant 44, 60, 62 may be formed as a continuous gasket within the sealant groove by any known process, particularly including extrusion, injection molding, and/or casting sealant deposition techniques. The release agent may be coated on the groove, or may be included in the material of which the carrier is constructed. As an alternative, the carrier may simply be formed of any material which has a lower adhesion characteristic than the workpiece which is to be carried on the carrier. The shape of the groove is configured to correspond to the desired shape of the seal and gasket to be placed on the workpiece. To this end, the groove can be varied along all three dimensions, including its thickness and curvature.

The fundamental feature of this invention is the combined sealant groove which provides both a mold and a carrier to transport the sealant. The sealant may thus be formed in the carrier, and transported on the carrier in its formed state. The sealant groove not only serves to protect the sealant, it also reduces the number of steps over prior art systems which form the sealant in one location and then transported it in some other fashion.

Although preferred embodiments of the present invention have been disclosed, a worker of ordinary skill in the art would recognize that certain modifications would come within the scope of this invention. For that reason the following claims should be studied in order to determine the true scope and content of this invention.

We claim:

1. A carrier for transporting a sealant comprising:
   a body including a groove formed corresponding to the shape of a desired sealant for a workpiece which is to receive the sealant, and
   said groove being adapted to receive a sealant, said groove including a release agent such that said sealant is easily separated from said groove.

2. A carrier as recited in claim 1, wherein an upper surface of said body includes said groove, said upper surface also including a peg opening, a lower surface of said body including a peg extending downwardly from said lower surface, and said peg and said peg opening having similar shapes which have a greater dimension along one direction than along another.

3. A carrier as recited in claim 2, wherein there are a plurality of pegs and peg openings which are generally oblong, such that the carrier may be rotated 90 degrees relative to an adjacent carrier whereby said pegs of one carrier do not extend downwardly into peg openings of an adjacent carrier to provide a first distance between a stacked upper surface of one carrier and said lower surface of a stacked adjacent carrier, and said carriers being rotatable such that they are aligned with each other, and wherein said pegs then extend downwardly into said peg openings such that the spaced difference between the upper surface on one carrier and the lower surface on the adjacent carrier is less than said first distance.

4. A carrier as recited in claim 1, wherein a lower surface of said body includes a boss which extends downwardly and is adapted to contact a workpiece carried on a lower adjacent stacked carrier, said boss holding said workpiece downwardly onto a sealant received in said sealant groove in the lower adjacent stacked carrier.

5. A carrier as recited in claim 1, wherein said groove is generally rectangular in cross-section.

6. A carrier as recited in claim 1, wherein a skirt extends vertically downwardly from an outer edge of an upper face of said body.

7. A method of transporting a sealant on a carrier comprising the steps of:
  (1) providing a carrier having a sealant groove in an upper surface;
  (2) inserting a release agent into said sealant groove;
  (3) inserting a sealant into said sealant groove; and
  (4) transporting said sealant in said groove.

8. A method as recited in claim 7, wherein the method includes the further steps of:
  (5) placing a workpiece on said carrier such that said workpiece contacts said sealant.

9. A method as recited in claim 7, wherein a plurality of said carriers receive said sealant, and are stacked on top of each other to transport said sealant in step (3).

10. A method of transporting workpieces on carriers comprising the steps of:
  (1) providing a plurality of carriers each including a sealant groove;
  (2) inserting a sealant in the sealant groove;
  (3) placing a workpiece on each carrier; and,
  (4) stacking adjacent ones of said plurality of carriers in a first position.

11. A method as recited in claim 10, wherein said carriers are stacked in said first position relative to adjacent carriers while said sealant or said workpieces are received on said carriers.

12. The method of claim 10 further comprising the step of removing the workpieces from the carriers.

13. The method of claim 12 wherein said step of removing the workpieces comprises the subsidiary steps of:
  adhering the sealant to the workpieces; and,
  removing the sealant from the carriers with the workpieces.

14. The method of claim 10 wherein each of said plurality of carriers comprises a peg opening on an upper surface, and a peg extending downwardly from a lower surface, said peg and said peg opening being configured such that in a first non-aligned orientation, said peg extends downwardly into said opening for a first depth, and when said carriers are rotated by 90 degrees from said first orientation to an aligned second orientation, said pegs extending downwardly into said peg opening by a second depth which is greater than said first depth, and wherein during said step of stacking adjacent ones of said plurality of carriers in a first position, the carriers are stacked into the first non-aligned orientation.

15. The method of claim 14 further comprising the step of rotating said carriers to said second aligned orientation in which said carriers are stacked in a smaller volume.

16. A carrier for transporting a sealant comprising:
  a body with corners and having upper and lower surfaces, said upper surface including a sealant groove adapted to receive a sealant for a workpiece, said groove corresponding to the shape of the sealant;
  said upper surface at each of the corners thereof including a peg opening;
  said lower surface at each of the corners thereof including a peg extending downwardly from said lower surface;
  each peg and peg opening having similar shapes which have a greater dimension along one direction than along another;
  said peg opening being generally oblong; and
  said lower surface of said body including a boss which extends downwardly and is adapted to contact a workpiece carried on a lower adjacent stacked carrier, said boss being adapted to hold the workpiece downwardly onto a sealant received in the sealant groove in the lower adjacent stacked carrier.

17. The carrier as recited in claim 16, wherein said body is generally rectangular.

18. The carrier as recited in claim 17, wherein said rectangular body is of generally square configuration.

19. The carrier as recited in claim 16, wherein a skirt extends vertically downwardly from an outer edge of an upper face of said body.

20. A carrier structure including a plurality of carriers as defined in claim 16, one carrier being stacked upon an adjacent carrier, such that one carrier may be rotated 90° relative to an adjacent carrier whereby the pegs of one carrier do not extend downwardly into peg openings of an adjacent carrier to provide a first distance between a stacked upper surface of one carrier and the lower surface of a stacked adjacent carrier, and said carriers being rotatable such that they are aligned with each other, and wherein the pegs then extend downwardly into said peg openings such that the space difference between the upper surface on one carrier and the lower surface on the adjacent carrier is less than said first distance.

* * * * *